Oct. 13, 1970      P. FORTESCUE ET AL      3,533,911
           NUCLEAR REACTOR SYSTEMS
Filed April 14, 1967                8 Sheets-Sheet 1
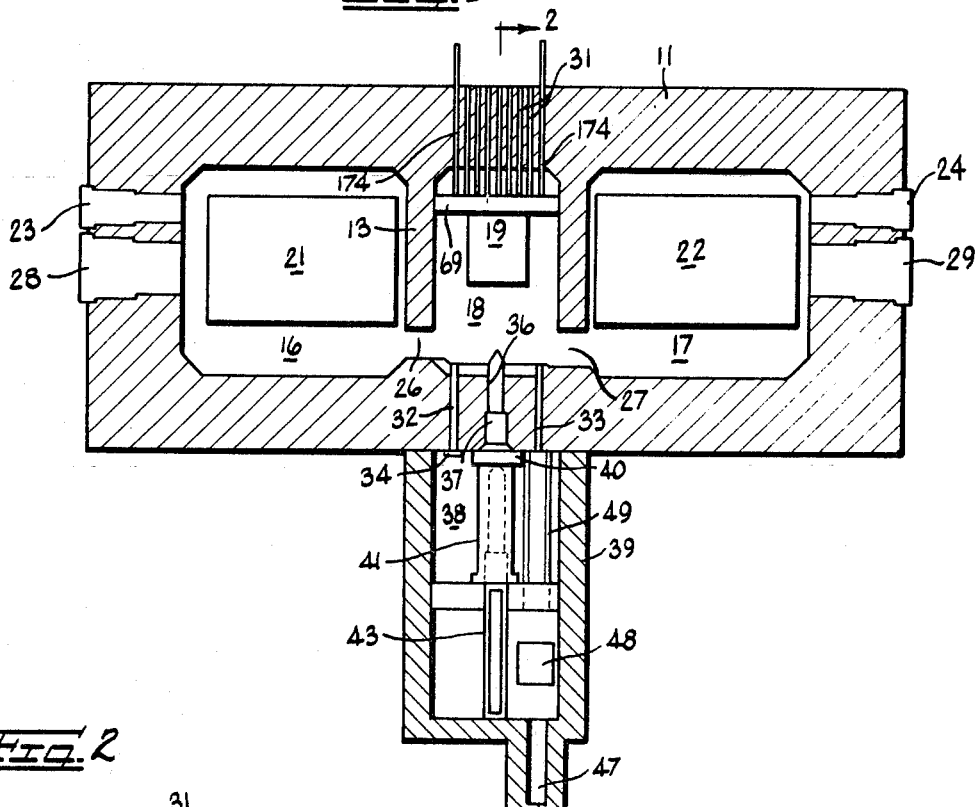
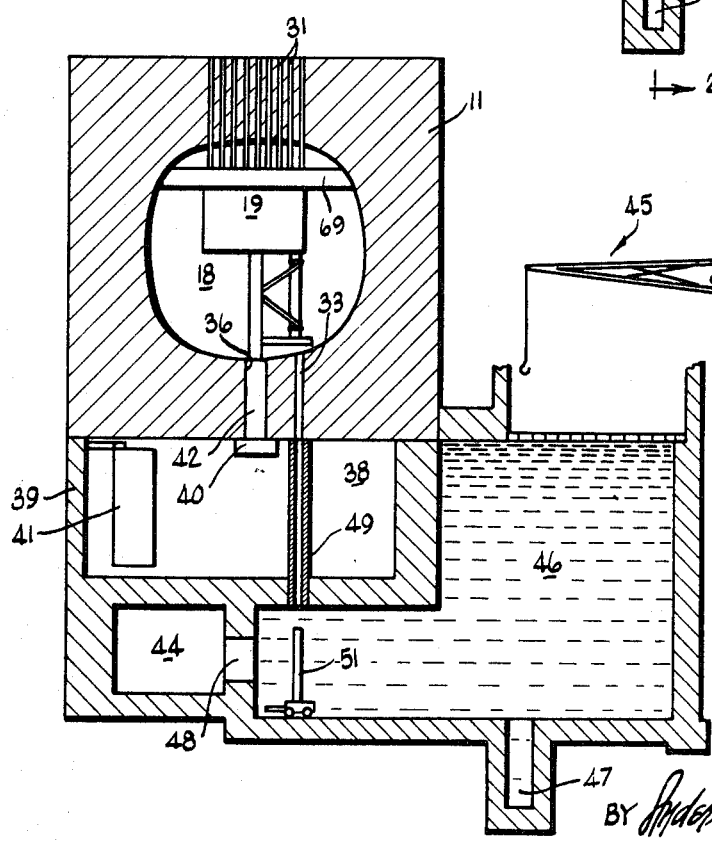
INVENTORS
PETER FORTESCUE
RICHARD J. RINGSMUTH
BY Anderson, Luedeka, Fitch, Even, & Tabin
ATTYS.

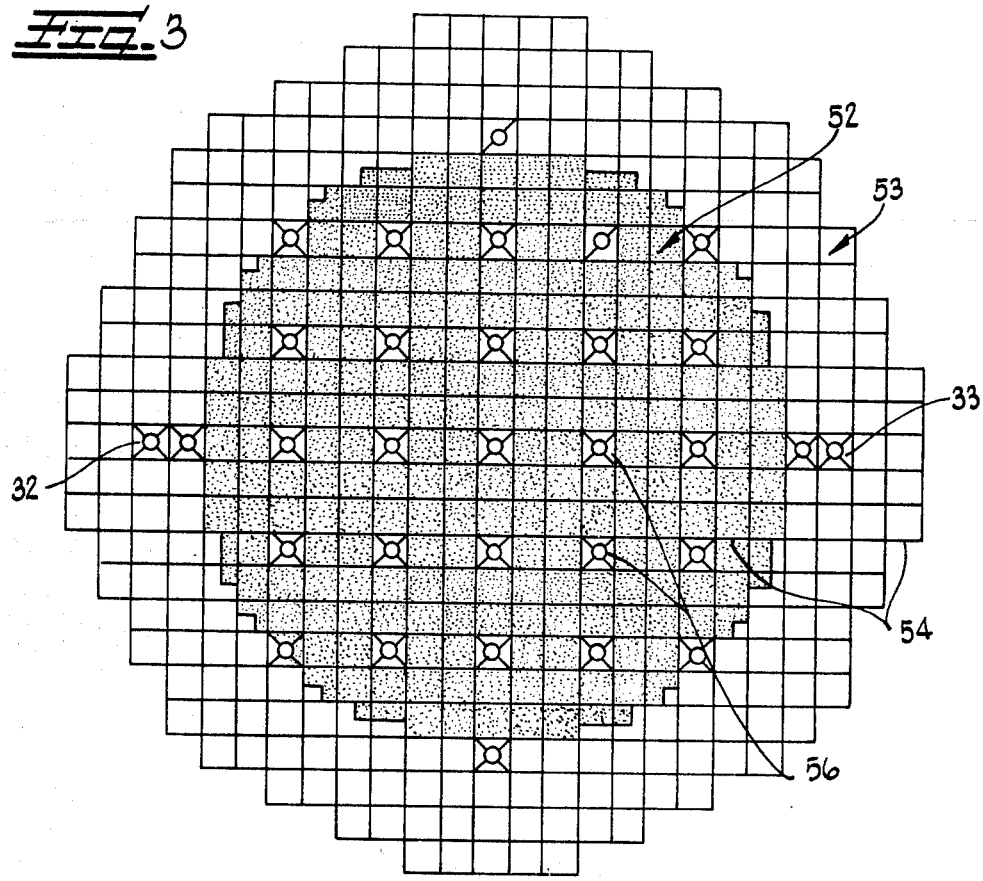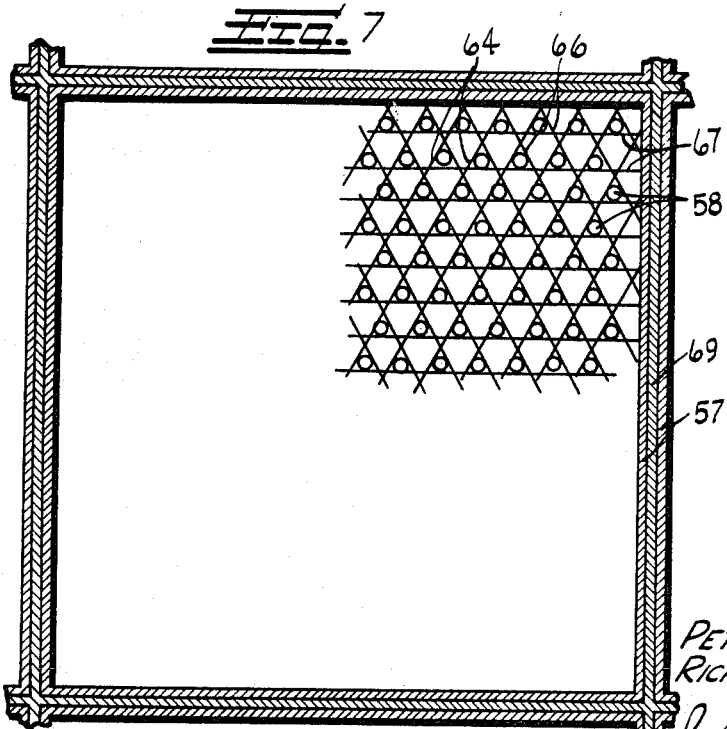

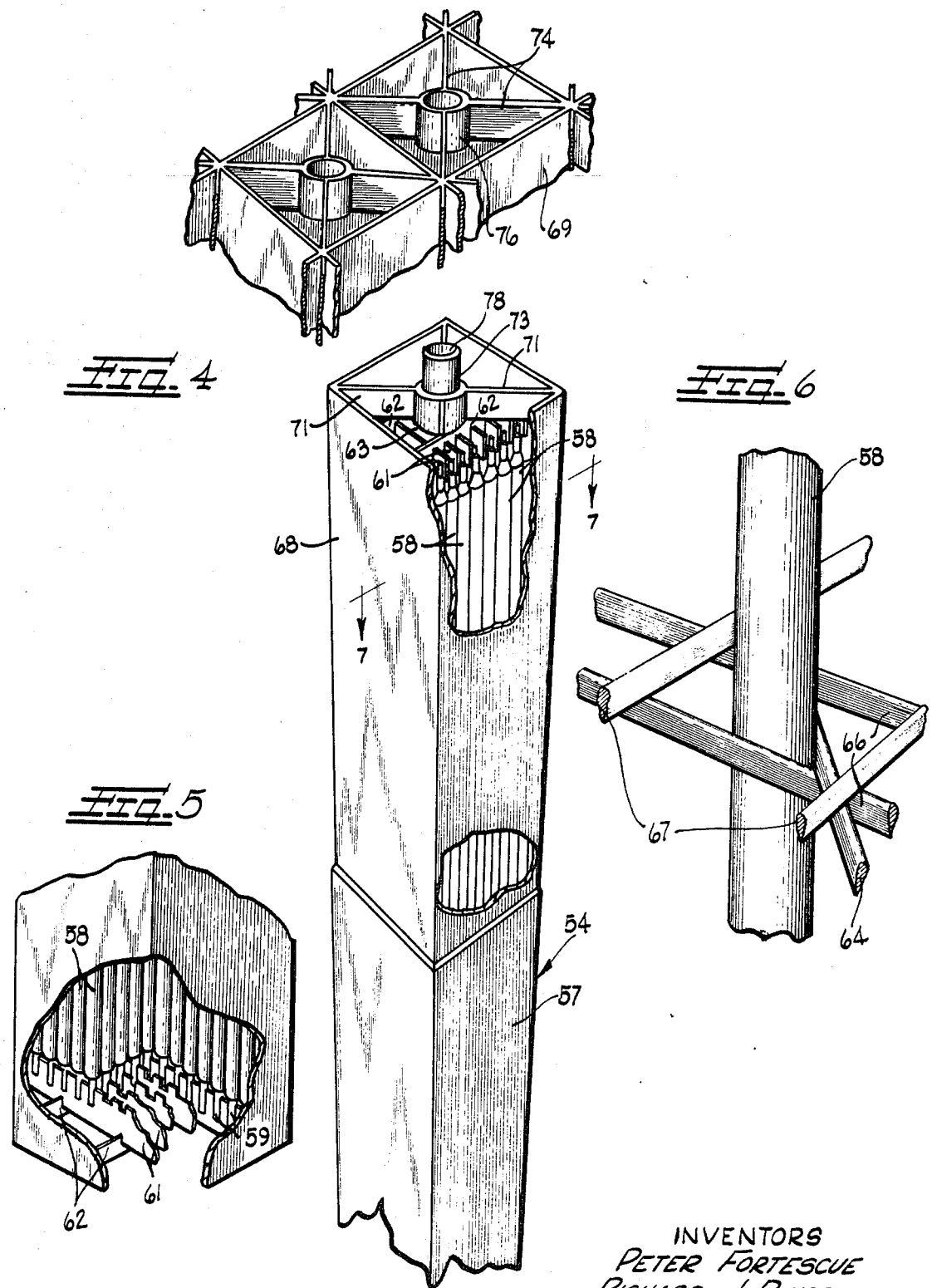

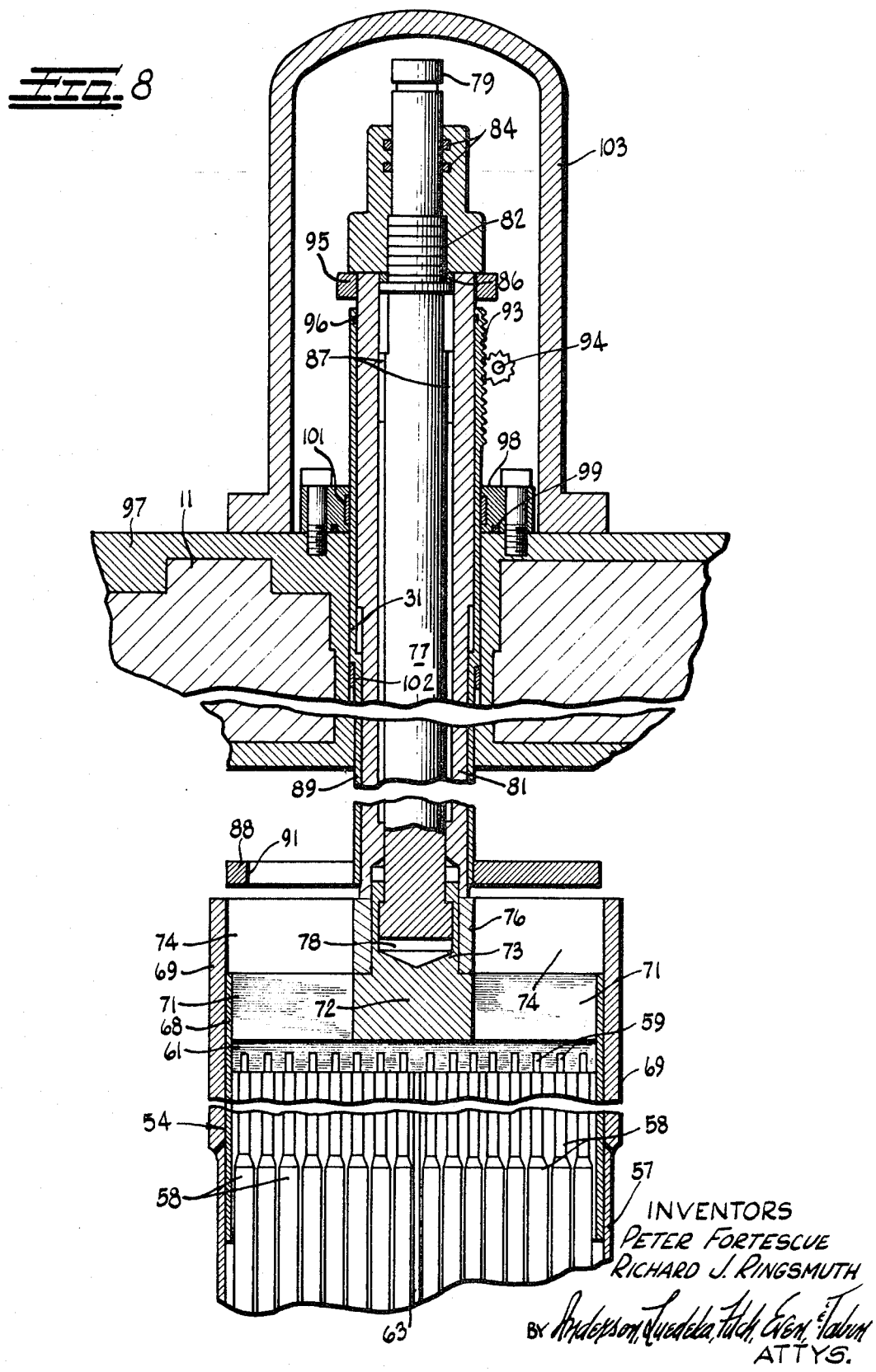

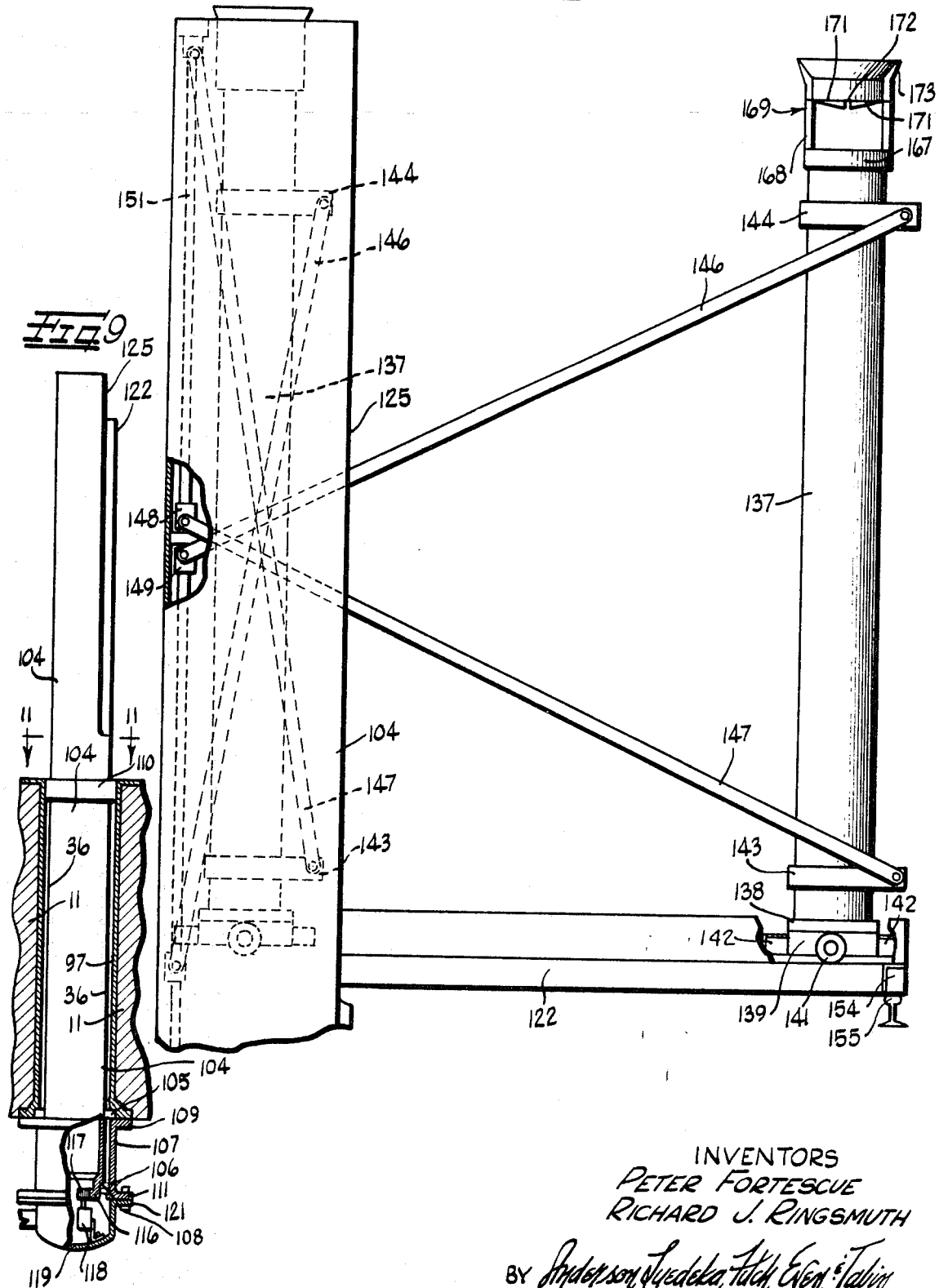

INVENTORS
PETER FORTESCUE
RICHARD J. RINGSMUTH
BY Anderson, Luedeka, Fitch, Even, & Tabin
ATTYS.

Oct. 13, 1970   P. FORTESCUE ET AL   3,533,911
NUCLEAR REACTOR SYSTEMS

Filed April 14, 1967   8 Sheets-Sheet 8

INVENTORS
PETER FORTESCUE
RICHARD J. RINGSMUTH
BY Anderson, Luedeka, Fitch, Even, Tabin
ATTYS.

United States Patent Office 3,533,911
Patented Oct. 13, 1970

3,533,911
NUCLEAR REACTOR SYSTEMS
Peter Fortescue, Rancho Santa Fe, and Richard J. Ringsmuth, Solana Beach, Calif., assignors, by mesne assignments, to Gulf General Atomic Incorporated, San Diego, Calif., a corporation of Delaware
Filed Apr. 14, 1967, Ser. No. 630,899
Int. Cl. G21c 19/10
U.S. Cl. 176—30                           11 Claims

ABSTRACT OF THE DISCLOSURE

A nuclear reactor system is described in which the core is comprised of a plurality of individual core elements, each supported by an associated handling rod. The handling rods extend through penetrations in the top of a reactor vessel, are detachable from the core elements, and are used to raise the individual core elements from and lower the individual core elements into, a handling machine beneath the core. A load transfer sleeve surrounds each handling rod and transfers the weight of the corresponding core element to a supporting grid inside the reactor vessel. The handling machine provides coolant flow over the core elements while they are moved between a position below their station in the core and a position over an access penetration in the reactor vessel. When not in use, the handling machine is removable through a penetration in the reactor vessel beneath the core.

---

This invention relates to nuclear reactor systems and, more particularly, to an improved nuclear reactor system incorporating a novel arrangement for supporting and handling core elements within a reactor vessel. The invention also relates to certain apparatus utilized in such a system and to an improved method for utilizing such apparatus which eliminates many design problems.

Many types of nuclear reactors comprise a plurality of core elements and means for supporting the core elements at an operating station or position to form a reactive core. Such core elements may be comprised of fissile or fertile material, neutron moderating material, neutron reflecting material, or combinations of some or all of these. Before starting reactor operation, the core is usually formed of the core elements and, after certain periods of operation, the core is usually refuelled by replacing some or all of the core elements containing fissile material. Periodic replacement of core elements containing fertile, moderating or reflecting material may also be desirable.

Core element handling operations, such as are necessary when first forming the core and when refuelling the core or replacing verious non-fissile core elements therein, may comprise several different operations. Such operations may include attaching and detaching core elements from the supporting means which hold them at the operating stations or positions in the more. Handling operations may also comprise transporting the core elements between their operating stations in the core and suitable storage stations.

Usually, some type of reactor vessel is provided for enclosing the core to contain radio-active products in the event of an accident and, if desired, to also provide a biological shield for personnel working about the reactor. The reactor vessel may also be constructed to contain a liquid or gas coolant for the core. Where storage of core elements takes place outside the reactor vessel, handling operations usually include transporting the core elements into and out of the reactor vessel through a suitable penetration provided therein.

The foregoing described handling operations may be accomplished by apparatus which is permanently installed inside of the reactor vessel and which is remotely controlled from outside the reactor vessel. Such an arrangement, however, may require relatively complex machinery, thereby presenting reliability and cost problems. Such permanently installed internal apparatus may also require a correspondingly larger reactor vessel to provide sufficient room. This results in additional cost and may be undesirable where space is limited.

In performing the foregoing described handling operations for transporting the individual core elements, it is frequently desirable to provide a continuous flow of coolant through the core element or around the core element while it is being transported. This is particularly desirable when core elements are being removed from the core after operating therein for some period of time, since the core elements are frequently near the core operating temperature as they are removed.

It is an object of this invention to provide an improved nuclear reactor system.

Another object of the invention is to provide an improved nuclear reactor system wherein many of the handling operations may be directly controlled from outside of the reactor vessel.

It is another object of the invention to provide a nuclear reactor system wherein the core elements are supported from points externally of the reactor vessel to facilitate handling thereof.

A further object of the invention is to provide a nuclear reactor system wherein the core elements are supported externally of the reactor vessel and may be moved from a position in the reactive core to a position out of the reactive core by handling means which are directly controlled from outside of the reactor vessel.

Still another object of the invention is to provide an improved core element for a nuclear reactor core in which impedance to the flow of coolant therethrough is minimized while providing satisfactory support for portions of the core element.

A still further object of the invention is to provide an improved transport mechanism for use in a nuclear reactor system.

It is a further object of the invention to provide an improved method for orienting certain parts of internal apparatus in a nuclear reactor system so as to permit such orientation to be accomplished by means outside the reactor vessel.

Other objects of the invention will become apparent to those skilled in the art from the following description taken in connection with the accompanying drawings wherein:

FIG. 1 is a side full section view of a nuclear reactor system constructed in accordance with the invention;

FIG. 2 is a sectional view taken along the line 2—2 of FIG. 1;

FIG. 3 is an enlarged top plan schematic view of the reactive core utilized in the system of FIGS. 1 and 2;

FIG. 4 is an exploded perspective view, with parts broken away, of part of a supporting grid structure and a core element constructed in accordance with the invention;

FIG. 5 is a perspective fragmentary view, with parts broken out, of the lower end of the fuel element of FIG. 4;

FIG. 6 is an enlarged fragmentary view in perspective of an internal portion of the core element of FIG. 4;

FIG. 7 is a sectional view taken along the line 7—7 of FIG. 4;

FIG. 8 is a greatly enlarged full section side view illustrating means for supporting and handling a core element in accordance with the invention;

FIG. 9 is an elevational view, partially in section, of a transport mechanism constructed in accordance with the invention;

FIG. 10 is an enlarged elevational view illustrating the transport mechanism of FIG. 9 in operational posiiton;

Figure 9A:
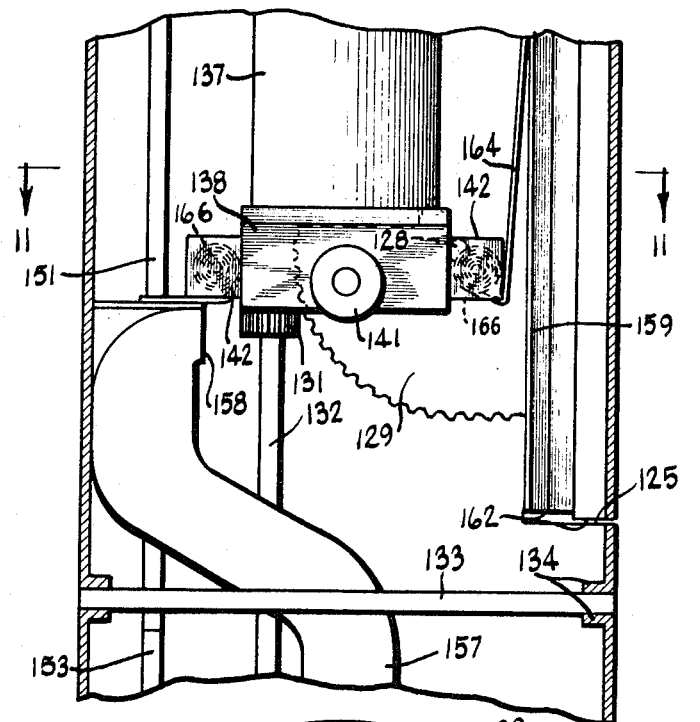
FIG. 9A is an enlarged sectional view of a portion of FIG. 9.
Figure 11:
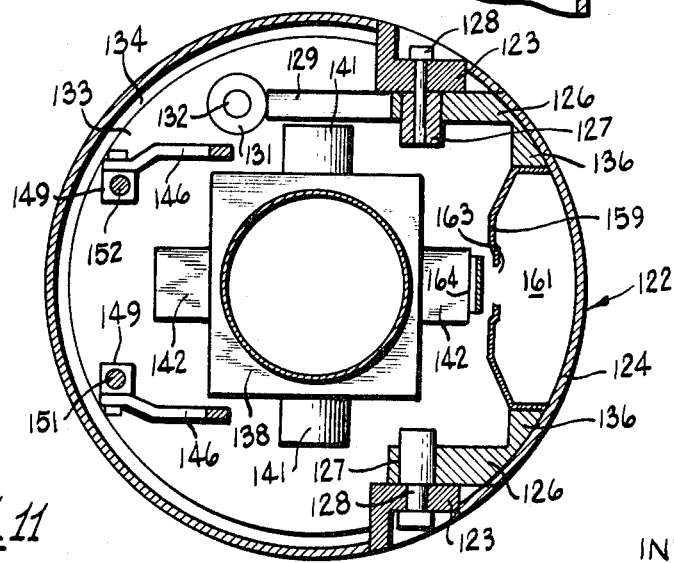
FIG. 11 is a sectional view taken along the line 11—11 of FIGS. 9 and 9A.
Figure 12:
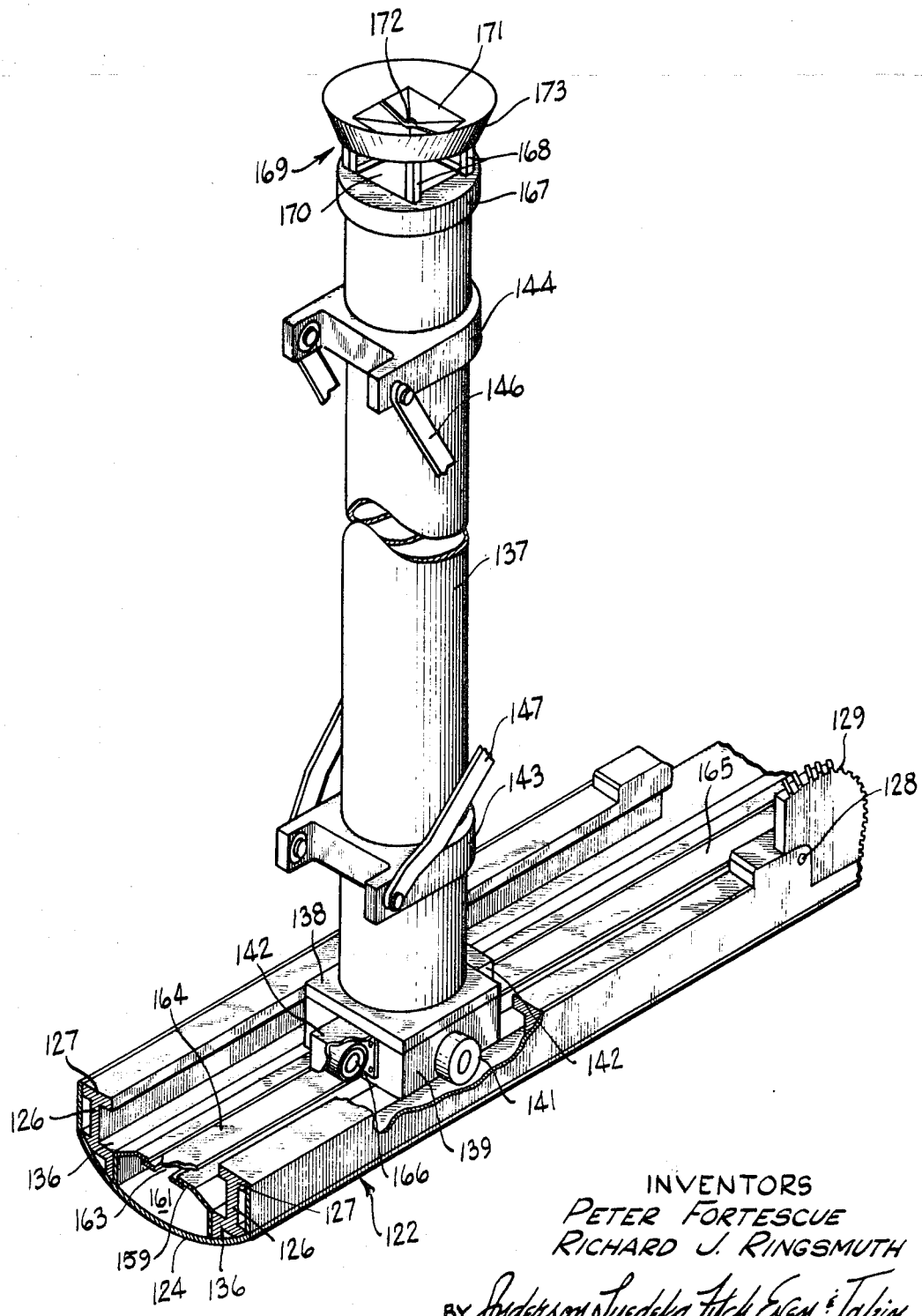
FIG. 12 is a perspective view of a portion of the mechanism of FIGS. 9–11.

Generally, in accordance with the invention, the nuclear reactor system comprises (FIGS. 1, 2 and 8) a plurality of core elements 54 which are supported at operating stations to form a reactive core 19. A reactor vessel 11 encloses the core and handling means are provided for transporting each of the core elements between a storage station and an intermediate station. A handling rod 77 is provided for each core element and has means thereon for coupling and decoupling to and from the core element in response to manipulation of the handling rod. The reactor vessel has a plurality of penetrations 31 therein, one for each of the handling rods, and the handling rods pass through the penetrations and are axially movable therein. Means are provided exteriorly of the reactor vessel for manipulating the handling rods to couple and decouple same to and from the core elements and to move the handling rods axially for transporting the core elements between their intermediate stations and their operating stations.

Generally, also in accordance with the invention, the reactor system includes (FIGS. 1, 2 and 8) means 69, 81 and 83 at least some of which are disposed exteriorly of the reactor vessel for supporting the core elements in their operating stations. The handling rods 77 which extend from the core elements pass through the penetrations 31 in one of the walls of the reactor vessel 11 and are releasably coupled to the supporting means exteriorly of the reactor vessel for supporting the core elements independently of the wall of the reactor vessel having the penetrations. The supporting structure may be supported interiorly of the reactor vessel on walls thereof other than the one wall having the penetrations. In such case, the supporting structure has portions 81 which pass through the penetrations and the handling rods are coupled to such portions exteriorly of the reactor vessel.

The core element of the invention (FIGS. 4–7), which may be used in the foregoing nuclear reactor system, generally comprises an elongated housing 57 and a plurality of elongated pins 58 contained within the housing. The housing may have a cross section of any suitable design and for the purpose of this application a square cross section is described. A suitable housing could be designed of rectangular, triangular, circular or other cross section. At least one wire grid extends transversely of the housing intermediate the ends thereof for maintaining a spacing between the pins. The wire grid is comprised of a plurality of cross wires 64, 66 and 67 (FIG. 6) of streamlined cross section to have a minimal effect on coolant flow.

The handling machine 42 of the invention, which may be used in the nuclear reactor system, generaly comprises (FIGS. 9–12) a core element receiving tube 137 which may be moved for transporting core elements received therein. The tube has a freely rotary section 169 with an interior cross section conforming to the outer periphery of the core elements. This provides a baffle for directing coolant through the core element in the receiving tube, and the rotary section may be oriented to conform with the orientation of a given core element in the core.

The core element handling method of the invention is for use in a nuclear reactor system having a core element receiving tube which is of the previously described type and wherein the core elements are of non-circular cross section. Because of the way in which the receiving tube is moved with respect to the pattern in which the core elements are arranged in the core, the tube rotates relative to the orientation of the core elements. The method comprises unloading the core by orienting the baffle section to conform with the orientation of a predetermined core element in the core, and moving the predetermined core element axially from its operating station into the receiving tube. The core element, while in the receiving tube, is then turned to position the baffle section so that it will be oriented with the next succeeding core element to be removed from the core when the receiving tube is aligned with such core element. The core element in the receiving tube is then moved to an intermediate station and removed from the receiving tube. The receiving tube is then moved into alignment with the next succeeding core element to be moved from the core.

(I) THE REACTOR SYSTEM, GENERALLY

Referring now in greater detail to the illustrated embodiment of the invention, the general layout of the reactor system may be seen in FIGS. 1 and 2. The reactor system includes a prestressed concrete reactor vessel 11 which defines an elongated chamber divided by walls 13 and 14 into two end compartments 16 and 17 and a middle compartment 18. A reactive core 19 is disposed within the middle compartment, and the end compartments 16 and 17 contain suitable vapor generating means 21 and 22, such as steam generators. Coolant circulators 23 and 24 extend through suitable penetrations in the end walls of the reactor vessel 11 for circulating a fluid coolant, such as gas, through the core and the vapor generators. Suitable ducting, not shown, and passages 26 and 27 are provided for this purpose. Removable plugs 28 and 29 are provided in the end walls of the reactor vessel 11 to provide access to the vapor generators from outside of the reactor vessel.

The top wall of the prestressed concrete reactor vessel 11 is provided with a plurality of vertical penetrations 31 for accommodating handling rods described subsequently. The lower wall of the reactor vessel 11 is provided with a vertical penetration 32 for loading core elements into the reactor vessel, and is provided with a vertical penetration 33 for removing core elements from the reactor vessel. A removable shield plug 34 is provided for the penetration 32 and can be displaced into a cask while loading fuel. The penetration 32 is also provided with a suitable means (not illustrated) for preventing coolant escape, such as isolation valves at top and bottom of the penetration sufficiently separated to permit insertion of the fuel element between them and means for purging the space therebetween. A penetration 36 is provided in the lower wall of the reactor vessel 11 located directly underneath the center of the core 19. The penetration 36 is closed by a removable plug 37.

A chamber 38 is provided beneath the central compartment 18 of the reactor vessel 11 and is defined by a concrete shield structure 39. The chamber 38 is a handling station from which new core elements are loaded into the reactor vessel. A suitable access door, not shown, communicates with the chamber 38 in order that new core elements may be passed into the chamber. The chamber 38 also accommodates a movable plug storage cask 41 which, in FIG. 1, is shown disposed directly beneath the access penetration 36 and, in FIG. 2, is shown moved away from the access penetration over to one side of the chamber 38.

The penetration 36, as will be explained, is used to accommodate and support a handling machine 42 during core element handling operations. To permit insertion of the handling machine, the plug 37 is removed by suitable automatic means, not illustrated, through a remotely operated gate type isolation valve 40 which is attached around the penetration 36, to a storage position within the cask 41, illustrated by the dotted lines in FIG. 1. The valve is opened and closed as required to maintain coolant in the reactor vessel. The cask may then be moved to the position shown in FIG. 2 and the handling machine inserted through the isolation valve 40 into the penetration 36 by a ram 43. The ram 43 is disposed directly below the penetration 36 and below the chamber 38 and contains suitable apparatus for lifting the plug 37 and the handling machine 42 into and out of the penetration 36. The handling machine 42 may also be stored in the storage cask 41 and may be secured in the penetration 36, as shown in FIG. 2, by suitable remote controlled means, also not shown.

The shield structure 39 is continued downwardly below the chamber 38 to form an observation room 44. The shield structure 39 is also continued below the chamber 38 to define a storage pool 46. The pool 46 is filled with water, and suitable storage equipment (not shown) may be provided for storing used core elements in shielded and cooled condition. The shield structure 39 is shown formed with a recess 47 in the floor of the storage pool 46. This is to permit the loading of storage racks (not shown) for the core elements without having to raise each core element in order to place it in a storage rack. An overhead crane 45 is used for the lifting operations.

A transparent window 48 is provided in a wall between the observation room 44 and the storage pool 46 to facilitate the storage rack loading operations by providing for visual observation. An unloading passage 49 extends through the chamber 38 between the penetration 33 and the storage pool 46. This passage is filled with water to the level of the water in the storage pool and permits core elements to be passed directly from the inside of the reactor vessel 11 to the storage pool 46. A transfer cask 51 is provided in the storage pool 46 for moving core elements passed through the passage 49 over to the recess 47 for loading in the storage racks.

Referring now to FIG. 3, the layout or pattern of the core elements in the illustrated reactor system is shown. The core is designed to operate with fast neutrons sustaining the chain reaction and comprises a central region 52 in which the core elements contain fissile material, and an annular region 53 surrounding the region 52 in which the core elements contain a fertile material and form a blanket. The core elements 54 will be described in greater detail subsequently, and are of square cross section. Some of the core elements, at regular intervals throughout the region of fissile material, contain void quadrants 56 to provide a passage in which control rods, not illustrated, may be disposed and moved. Penetrations, not illustrated, may be provided in the top wall of the reactor vessel 11 for accommodating the control rods and drive mechanisms therefor.

It will be seen that the region of fissile material is generally circular in outline, as is the entire core. Although the general outline of both, the regions 52 and 53 of the core is circular, it will be noted that the square cross section of the core elements 54, and the fact that they are placed immediately adjacent each other with common orientation, results in the core elements being laid out in a square or cartesian coordinate pattern.

(II) THE CORE ELEMENTS

Referring now to FIGS. 4 through 7, a preferred construction for the core elements is shown. The core elements are comprised of a housing 57 of square cross section which encloses a plurality of elongated pins 58. It is preferred that the pins each be comprised of a rod of fertile or fissile material in a suitable exterior cladding. In selecting the cross sectional size for the core elements, and accordingly the number and diameter of the pins 58 contained therein, one of the factors that must be considered is that the number of boxes should not be so large as to cause the reactor vessel penetrations for the support structure, described subsequently, to interfere with tendon placement in the prestressed concrete reactor vessel. The housing 57 and its associated elements should securely group the individual pins into a fixed matrix which is readily maneuverable during handling, and should also protect the pins during handling operations. The housing itself should occupy a minimum possible space so as not to significantly detract from the reactor's performance by interaction with neutrons and with the flow of fluid coolant through the core. Finally, the core element overall dimensions should be suffiicently small to permit easy radial zoning of the core into various fuel zones and to avoid significant temperature differences within the housing. The overall dimensions of the housing 57, however, should be large enough so that refuelling operations are not of prohibitive length.

The top and bottom of each pin 58 is provided with a solid plug 59 which may be used to hermetically seal the pin and which is used to mount it in the housing 57. As may be seen in FIGS. 4 and 5 each plug is slotted and fits into a notched cross member 61 both at the top and bottom of the housing 57. The notches (not visible) in the cross members 61 are equal to the diameter of the plugs 59 but are not as deep. The top plugs are welded to the top cross members 61 and are thus fixed at that location. Some axial clearance is left between the slotted ends of the plugs 59 at the lower end of the pins 58 and the notches in the cross members 61 in order to allow the pins to grow thermally in the axial direction. The cross members 61 at the top and bottom of the housing 57 run in the same direction and the plugs are spaced at intervals along the cross members, with the fuel pins being arranged in a triangular pitch. Minimum clearance is provided in the width of the slots and the thickness of the cross member 61 to restrict pin movement laterally.

In addition to the cross members 61 at the top and bottom of the housing 57, which provide stiffening for the walls of the housing, there are two additional cross members 62 at both the top and the bottom of the housing 57. These cross members extend perpendicular to the cross members 61 at their respective ends and provide additional stiffening for the walls of the housing 57.

During reactor operation, the individual pins 58 in the fuel section of the core may exhibit a tendency to bow as a result of the neutron flux gradiant. In order to restrain this bowing to insure uniform coolant distribution, a plurality of grids are placed in the housing along the length thereof. Each of the grids is identical, and in FIG. 6 may be seen to be comprised of three groups of mutually parallel wires arranged to cross each other at approximately 60° angles. The wires may be laced to the surrounding housing in a manner similar to the strings of a tennis racket, and form a plurality of equilateral triangles. The spacing of the wires 64, 66 and 67 is selected to form triangles which will hold the fuel pins 58 in position and restrain bowing thereof. If desired, the wires may be locked together at some or all of their intersections by means of local spot welding or dip brazing, or by employing a basket weave with alternate over and under crossing rather than the single plane arrangement illustrated.

As an alternative, the wires may be arranged at 45° angles with respect to the walls of the housing, thereby crossing each other perpendicularly and forming individual squares for the fuel pins. In such a case, the pins are arranged in a square pitch and may be divided into four sections by baffles which extend perpendicular to the walls of the housing and extend the length of the housing. These members provide additional stiffening and also serve to enable radial zoning of the core to involve smaller groups of pins than are in a full core element and to permit permanent orificing or baffles to be installed within one of the quadrants in the housing if desired. Naturally, other fuel pin arrangements may be satisfactory.

As will be explained subsequently, a fluid coolant is directed through the housing 57 such that it passes around the pins 58 to remove heat therefrom. In a fluid cooled nuclear power reactor such as the illustrated reactor, greater efficiency is obtained if the pressure drop, as the fluid coolant flows past structural elements in the housing 57, is minimized. To this end, the cross section of the wires 64, 66 and 67 is of aerofoil design, preferably having a maximum dimension in the direction of the fluid flow which is approximately twice that of the maximum dimension transversely of the fluid flow. As compared with a grid of wires of circular cross section (and having a diameter equal to the maximum transverse diameter of the aerofoil cross wires), the pressure drop caused by the streamlined wire spacer grid is only approximately 1/50 as great. The arrangement is particularly suitable when the space between the pins 58 must be large compared with their diameter, as is often the case with fast reactors.

The housing 57 includes an upper section 68 of smaller cross sectional dimension. This enables the grid plate 69, which supports the core elements and which is described subsequently, to be fabricated of ribs of substantial width without wasting clearance space between core elements. The pins 58 have reduced diameter in the upper section 68 and are bent slightly toward the center of the box to fit within the smaller dimensions thereof. The shoulder formed between the reduced size section 68 and the rest of the housing 57 is tapered for locating the housing accurately in the supporting grid plate 69.

(III) THE CORE ELEMENT SUPPORT STRUCTURE

Referring now to FIG. 8, the manner in which the core elements are supported in their operating stations in the core may be seen. Only one core element is illustrated in FIG. 8, but it is to be understood that the other core elements in the core are supported in a similar manner. The supporting grid 69 consists of a plurality of perpendicular metal plates arranged to intersect each other at right angles and form a grid. The grid 69, as may be seen in FIGS. 1 and 2, is supported from the side walls of the compartment 18. Although the details of such support are not illustrated, this may be accomplished by providing recesses in the concrete walls of the compartment and placing supporting beams for the grid which extend across the compartment and rest on suitable wear pads disposed in the recesses. Other types of suspension, such as pillars extending upwardly from the bottom of the compartment 18, may be satisfactory under certain circumstances.

Returning now to FIG. 8, and referring at the same time to FIG. 4, it may be seen that the top of the housing 57 is provided with four diagonal webs 71. The webs 71 support a central plug 73 at a widened base 72 thereof. The plug 73 is hollow and extends upwardly to provide a coupling for supporting the core element, as will be explained.

As may be seen from the same two figures (FIGS. 4 and 8), the upper part of each box formed by the grid 69 is provided with four diagonal webs 74 which extend inwardly from the four corners of each box in the grid 69. The webs 74 support a central collar 76 in each box of the grid which is adapted to receive the upper portion of the plug 73 of the associated core element.

Figure 14:
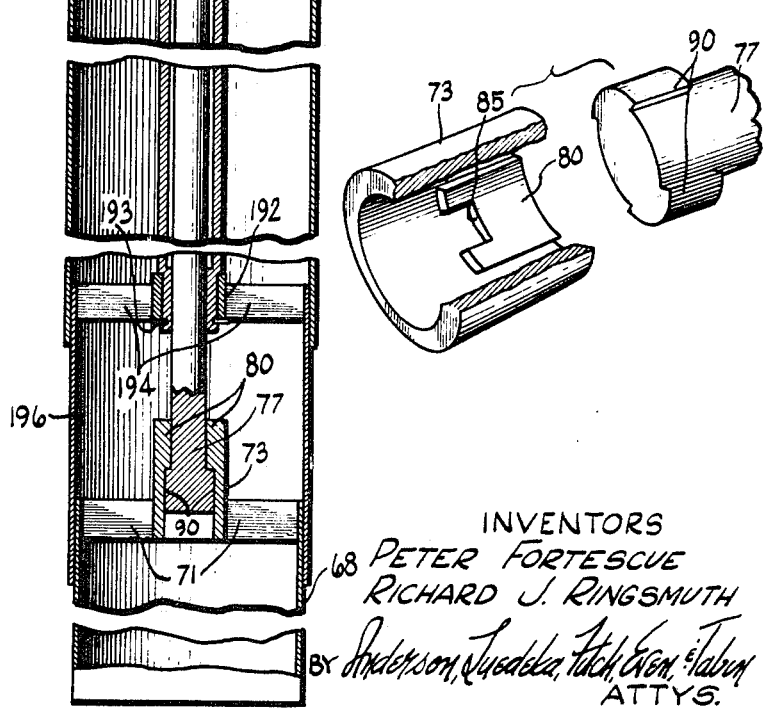
FIG. 14 is an exploded view illustrating the coupling between the core element and both the supporting and handling means, and the loading and unloading tool.

A handling rod 77 extends through the penetration 31 in the reactor vessel 11 and may be coupled in a recess 78 in the plug 73 by a bayonet type coupling illustrated in FIG. 14. The interior of the plug 73 has a pair of projections 80. Each projection has a recess 85 formed in its lower edge and having a dovetail like shape. The end of the rod 77 carries a pair of dovetail like projections 90. These can pass between the projections 80, and when the rod is turned, can mate in the recesses 85. The type of coupling is such as to permit the rod 77 to be coupled and uncoupled to and from the plug 73 on the core element by turning the rod with respect to the core element. The coupling is such, however, that when the projections 90 are in the recesses 85 relative rotary movement between the core element and the rod will not occur. When the weight of the core element exerts a downward force on the bayonet coupling, the projections 90 will be securely held in the recesses 85. This permits the core element to be turned by turning the rod.

The handling rod 77 is provided at its upper end with a cable coupling attachment 79. A suitable hoisting cable may be attached thereto for raising and lowering the rod 77 and hence the core element attached thereto. The cable attachment 79 may be provided with a swivel in order to permit the rod 77 to be rotated with respect to the cable.

The rod 77 is not only used for handling the core elements, as will be described subsequently, but is also used as part of the support for the core elements in their operating stations in the core. It is undesirable to support or "hang" the core elements from the top wall of the reactor vessel 11 because, in order to sustain such a load, it would be difficult to properly reinforce the reactor vessel. Accordingly, the grid 69 is used to support the core elements. Were the core elements to be attached to the grid internally of the reactor vessel, complex and expensive equipment might be necessary to connect and disconnect the core elements from their supporting grid by remote control.

Accordingly, the connection between the core elements and the supporting grid is brought out to a position exteriorly of the reactor vessel. This is accomplished by a load transfer sleeve 81 which is coaxial with the rod 77 and rests, at its lower end, on the top edge of the collar 76. The upper end of the handling rod 77 includes a threaded section 82, and a locking nut 83 is threaded upon this section and bears against the upper edge of the sleeve 81. Accordingly, the weight of the core element is transferred through the handling rod 77 and the sleeve 81 to the collar 76 in the grid 69. When it is desired to move the core element from the core, as will be explained in greater detail subsequently, the nut 83 may be loosened and the rod 77 lowered by the cable, not shown. The nut 83 is sealed to the shaft 77 by a pair of annular seals 84 at the top end of the nut and by an annular seal 86 against the bottom face of the nut.

A plurality of keys 87 are provided near the top end of the sleeve 81 and operate to key the sleeve 81 to the rod 77 to prevent relative rotation therebetween. The rod 77, however, is free to move axially with respect to the sleeve 81. Thus, when the core element is moved axially from its operating station in the reactor core to an intermediate station, as will be explained in greater detail subsequently, the shaft 77 may be turned to disengage the bayonet coupling to the plug 73 by turning the sleeve 81. The top of the sleeve 81 may be provided with suitable means such as a collar 95 for effecting such turning.

An orificing plate 88 is provided at the top of each box of the grid 69. This plate or shutter extends outwardly from an orificing sleeve 89 and is provided with a plurality of openings or slots 91. The slots 91 extend radially outward from the sleeve 89 and terminate a short distance from the outer periphery of the circular shutter 88. The openings 91 are distributed at convenient circumferential intervals around the shutter 88 and make it very simple to remove the shutter in the event dismantling is necessary since all that need be cut is the short thickness of metal between the slot 91 and the outer periphery of the shutter. The slots or openings 91 also serve to permit the flow of coolant therethrough. Some flow of coolant will also occur around the shutter due to its circular periphery used in connection with the square box in the grid 69. The outer diameter of the shutter is slightly less than the interior dimension of the box in the grid.

The shutter is adjusted axially with the sleeve 89 by a rack and pinion arrangement at the top of the sleeve consisting of a rack 93 and a pinion 94. The pinion 94 may be driven by a suitable motor, not shown. An annular seal 96 is provided at the top end of the sleeve 89 between the sleeve 89 and the load transfer sleeve 81. It should be noted at this point that the reactor vessel is provided with a liner 97 which covers the outer and inner surfaces of the reactor vessel and extends through the penetrations 31. The sleeve 89 is disposed in a seal and bearing ring 98 which is bolted to the liner 97 around the end of the penetration 31 on the top of the reactor vessel. An annular seal 99 seals the ring 98 to the liner, and a combination sliding seal and bearing arrangement 101 of suitable construction permits the orificing sleeve 89 to move in the ring 98 and seals the orificing sleeve to the ring to maintain the integrity of the reactor vessel. A similar seal and bearing arrangement 102 is provided in the penetration 31 toward the lower end thereof to stabilize the orificing sleeve 89. A dome or cap 103 is bolted to the top of the liner 97 and covers the elements which protrude above the penetration 31 when the core element is at the operating station. The interior of the dome 103 may be pressurized to the pressure of the coolant in the interior of the reactor vessel to thereby improve the effectiveness of the sealing. During core element handling operations, as will be explained, the dome 103 is removed.

(IV) THE HANDLING MACHINE

As previously mentioned, a handling machine 42 is bolted in the penetration 36 in the reactor vessel 11 during core element handling operations. The handling machine is illustrated in FIGS. 9, 9A, 10, 11 and 12. The mechanism includes a housing 104 supported by two annular bearings 106 in a bearing housing 107. The lower part of the housing 104 has an annular shoulder 108, and the upper one of the bearings 106 is a thrust bearing and receives the shoulder. An annular bearing 105 mounted in the liner 97 of the penetration stabilizes the housing 104, as does a bushing ring 110 on the housing 104 toward the upper end of the penetration. The handling machine, when in operating position, is mounted in the penetration 36 and the housing extends through the penetration to project above it. The bearing housing 107 has an outwardly extending flange 109 which is bolted to the liner 97 at the lower end of the penetration.

The lower end of the housing 104 has an inwardly turned annular gear 116 which is driven by a pinion gear 117. The pinion gear is driven by a motor 118 mounted to and contained in a lower end cap 119 for the housing 104. The lower end cap is bolted to a flange 111 on the bearing housing 107 by an outwardly turned flange 121. Thus, rotation of the motor 118 will rotate the housing 104 with respect to the bearing housing 107, and hence the reactor vessel.

The housing 104 carries and contains an arm 122 which is adapted to swing radially outward through an opening 125 in the housing (from the positions shown in FIGS. 9 and 11 to the position shown in FIG. 10) when core element handling operations are to be performed. When the arm is in its upright position in the upper part of the housing 104, it will be appreciated that the handling machine may be readily inserted through the penetration 36. The arm is supported in a pair of brackets 123 which extend inwardly from the housing 104. The arm comprises a curved under plate 124 which, when the arm is in the upright position, covers the opening 125 and completes the cylindrical outer surface of the housing 104. A pair of side walls 126 extend from the under plate 124 parallel with each other along opposite edges thereof. The walls 126 are pivotally secured on pivot pins 128 passed through the brackets 123.

A worm gear 129 is secured to the inner end of one of the walls 126 and is in mating engagement with a worm 131. The worm is on the upper end of a worm shaft 132 which extends vertically upward through the housing 104 in the interior thereof, passing through a horizontal plate 133. The horizontal plate 133 is secured within the upper part of the housing 104 between inwardly turned annular flanges 134. The housing is separable at the flanges for assembly purposes. The lower end of the shaft 132 is driven by a suitable motor contained within the housing 119 and not illustrated. Thus the arm 122 may be raised and lower in accordance with rotation of the shaft 132.

The side walls 126 are each formed with an inwardly turned portion 136. The portions 127 and 136 form a pair of parallel tracks extending the length of the arm 122. The core element receiving tube 137 is guided on the tracks as it moves radially outward along the arm 122. The receiving tube 137 is supported on a plate 138 having a central opening therein communicating with the interior of the tube. Four walls 139 depend from the plate 138 and a pair of rollers 141 are secured to the side walls 139 and are adapted to ride upon the tracks 136. The pair of opposite walls which do not have the rollers 141 mounted thereto are provided with a pair of housings 142, the purpose of which will be explained subsequently.

Two collars 143 and 144 are secured toward opposite ends of the receiving tube 137. Each collar has a pair of arms 146 and 147 secured on opposite sides thereof. The arms in each pair pass on opposite sides of the receiving tube 137 and extend through the opening 125 in the upper part of the housing 104 left by the lowered arm 122. The arms are shaped to be able to freely cross each other and the arms 147 are secured to a respective pair of nuts 148, whereas the arms 146 are secured to a respective pair of nuts 149. One of the nuts 148 and one of the nuts 149 are threadably mounted upon a vertical worm 151. Similarly, the other nuts in the pairs 148 and 149 are threadably mounted on a vertically extending worm 152.

The worms 151 and 152 are driven by a corresponding pair of drive shafts 153 which extend vertically upward within the lower housing 104 and are driven by suitable motors contained within the cap 119. As the worms 151 and 152 are rotated, the threaded engagement between same and the respective nuts 148 and 149 is selected to be such that the two nuts on each worm are moved in opposite directions with respect to each other. Thus, if each of the worms is rotated in one direction, the nuts thereon will move apart, whereas if each of the worms is rotated in the opposite direction, the nuts will move toward each other. The result is a radial drive linkage by which the radial position of the tube 137 on the arm 122 may be readily controlled through operation of the motors driving the worms. The outermost position of the tube 137 is shown in solid lines in FIG. 10, whereas the internal position of the tube in the housing 104 is shown by the dotted lines in FIG. 10. In the latter position, and with the arm 122 up in its vertical position (FIG. 9A), a suitable shelf or similar device (not illustrated) may be provided to support the tube 137 and its associated parts in the housing 104.

It will be noted that a rotary wheel 154 is provided at the outer end of the radial arm 122. This wheel rests upon a circular rail 155 which is permanently mounted within the reactor vessel underneath the core. The latter constitutes the only internal permanently mounted element of the handling machine. As the motor 118 is activated to rotate the housing 104 with respect to the bearing housing 107, the arm 122, in its extended position, will sweep or rotate below the core and within the compartment 18. By varying the position of the radial support arm and by varying the position of the receiving tube 137 thereon, the receiving tube may be positioned with respect to the core 19. The movement is effected by variation of polar coordinate parameters. Thus, rotation of the housing 104 will determine the theta parameter and the operation of the worms 151 and 152 will determine the *r* parameter in a system of polar coordinates having its center on the axis of rotation of the housing.

As will be explained more fully below, the core elements may be lowered by the rods 77 into the core element receiving tube 137, and may be raised from the receiving tube into the core by the rods 77. It is particularly important, when a core element is being removed from the core after the element has been in the core during operation thereof, to cool the core element as it is being moved, since the core element will be quite hot. To effect cooling of the core elements as they are being moved in the receiving tube 137, and as they are being moved into and out of the receiving tube, a flow of coolant is established through the receiving tube. A conduit 157 extends upwardly within the housing 104, passing through the plate 133. The upper end of the fluid conduit 157 is provided with an orifice having a stepped edge surface 158. The arm 122 includes a hood 159 which extends between the tracks 136 and defines, with the under plate 124, a coolant passage 161. The inner end of arm 122 is extended beyond the pivot pins 128 so that the inner end will swing up to the orifice surface 158 as the outer end swings down. The hood 159 is displaced slightly from the inner end of the tracks 136 to form a stepped edge surface 162 which mates with the surface 158. Accordingly, communication is established between the conduit 157 and the passage 161 such that fluid will flow between the two.

As previously mentioned, the receiving tube 137 communicates through an opening in the plate 138 to a space between the side walls 139 above the hood 159. An elongated slot 163 is provided in the hood 159 and provides communication between the passage 161 and the interior of the walls 139. Fluid may thereby be conducted between the receiving tube 137 and the passage 161 in any position of the tube along the arm 122. To prevent a flow of coolant from the passage 161 through the slot 163 in regions other than the region between the walls 139, two constant force leaf springs 164 and 165 are provided, each being adapted to lie flat across the slot 163, with the edges of the constant force leaf springs 164 and 165 mating with channels formed in the hood alongside the slot. A slight cross sectional curvature may be provided in the constant force leaf springs in order to insure a slight pressure against the hood 159. One end of the leaf spring 164 is secured to the outer end of the hood 159. One end of the leaf spring 165 is secured to the top of the conduit 157. The opposite ends of the leaf springs 164 and 165 are adapted to roll up upon rollers 166 provided in the housings 142, on opposite sides of the base of the receiving tube 137. As the tube 137 is moved along the arm 122, the leaf springs will thereby close all of the slot 163 save for a short space between the rollers 166 to permit coolant flow between the passage 161 and the interior of the tube 137. The coolant flow is downward through the core element in the tube, through the passage 161 to the conduit 157, and from there via suitable means, not shown, to the inlet side of the circulators 23 and 24 (FIGS. 1 and 2).

As previously discussed, the core elements are of square outer shape. Accordingly, there will be spaces between the outer surface of the housing 57 of the core elements and the inner surface of the tube 137. To prevent coolant flow through this space and thereby to insure coolant flow through the core element in the tube 137 a baffle is provided. This baffle comprises a plate 167 which has a square opening 170 therein conforming with the outer shape of the core elements. Plate 167 has four posts 168 extending upwardly thereof and is mounted at the top of the tube 137 by suitable bearings, not shown. The result is a freely rotary section 169. The section is closed at its upper end by a pair of guide flaps 171 which extend inwardly from the tops of the posts 168 and which are free to pivot upwardly or downwardly as a core element is passed out of or into the tube 137. An opening 172 is formed in the center of the two guide flaps 171 and, with the guide flaps closed by suitable spring biasing means, not illustrated, the hole provides a guide for the handling rod 77 as it is inserted into the tube 137 for coupling to a core element therein.

The posts 168 support an outwardly flanged frustoconical section 173 which guides the core elements into the tube. The frusto-conical section has a square central opening which conforms in size and orientation with the area of the flaps 171 and the opening 170. As will be explained subsequently, the orientation of the freely rotary section may be varied to accommodate the particular orientation desired for a core element being passed therethrough in accordance with the method of the invention. Therefore, no remote control drive for orienting the section 169 is necessary.

(V) THE HANDLING TOOLS

Returning momentarily to FIGS. 1 and 2, the handling machine is utilized to move core elements between a position directly underneath their operating station in the core 19 and a position directly over one of the two penetrations 32 and 33. When loading core elements into th reactor vessel through the loading port or penetration 32, it is necessary to raise the core element high enough to permit the receiving tube 137 to be placed directly over the penetration. The core element may then be lowered straight down into the receiving tube. Conversely, when a core element is to be removed through the penetration 33, the core element is raised out of the receiving tube 137 to clear the top of same and is then lowered through the penetration 33 and the passage 49. To accomplish these raising and lowering operations, a handling tool 174 is provided directly above each of the penetrations 32 and 33 in the reactor vessel above the compartment 18. The tools 174 above each of the two penetrations are nearly identical and, consequently, only one will be described.

Figure 13:
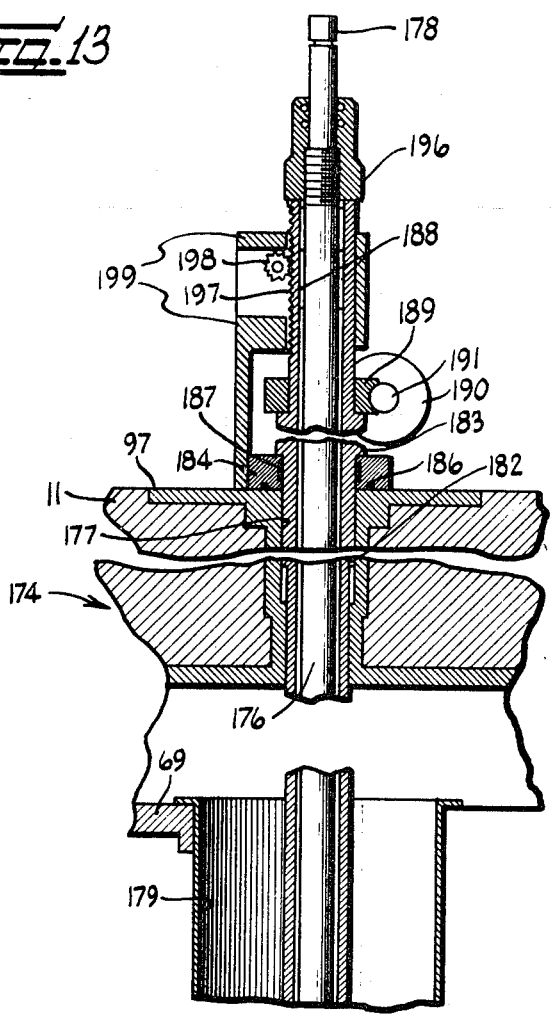
FIG. 13 is a full section side view illustrating a core element loading and unloading tool constructed in accordance with the invention.

Referring now to FIG. 13, the construction of a handling tool 174 may be seen in greater odetail. The tool includes a long handling rod 176 which is identical to the handling rod 77 previously discussed. A penetration 177 is provided to allow the rod 176 to pass through the reactor vessel 11. The liner 97 of the reactor vessel is brought out through the penetration 177. The lower end of the rod 176 is of a configuration to permit it to be releasably coupled to a plug 73 on one of the core elements. A bayonet type coupling is used similar to that illustrated in FIG. 14. A cable swivel attachment 178 is provided on the upper end of the rod 176 to permit a cable, extending from a hoist, not shown, to raise and lower the rod 176.

In order to maintain a coolant flow through the core element being handled, particularly during unloading when such core element is at relatively high temperature, a duct 179 is passed downwardly through the grid plate 69. The duct 179 has an outwardly turned flange at the top end thereof which rests on the upper edge of the grid and supports the duct therein. The normal flow of coolant is downwardly through the core. A flow of coolant will therefore be established downwardly through the duct 179 for cooling core elements during handling operations. If desired, a suitable closure or orificing shutter may be provided for the duct 179 to prevent coolant flow therethrough when the handling tool 174 is not in use.

A sleeve 182 is mounted coaxial with the rod 176 and extends downwardly through the duct 179. The upper end of the sleeve 182 has an outwardly turned shoulder 183 which rests on top of a ring 184, the latter being bolted to the top of the reactor vessel liner 97. The sleeve is of a length such that it terminates at its lower end just above the lower end of the duct 179. The sleeve is free to move axially upward from this position, but the shoulder 183 prevents it from moving lower. The ring 184 is sealed against the liner by an annular seal 186 and is also sealed to the sleeve 182 by an annular seal and bearing structure 187. The latter permits the sleeve 182 to rotate and move axially with respect to the ring 184.

The rod 176 is keyed to the sleeve 182 by a plurality of keys 188 and, with the rod lowered down to the bottom of its axial travel, the rod and the sleeve remain keyed together such that they may be turned as a unit. A worm gear 189 surrounds the sleeve 182 above the penetration 177 and is driven by a worm 191 turned by a suitable motor 190. As will be explained subsequently, the sleeve and handling rod may be rotated in order to orient the freely rotary section 169 on top of the receiving tube 137.

The lower end of the sleeve 182 extends through a collar 192, and a washer 193 extends from an annular groove at the lower end of the sleeve 182 for supporting the collar 192 thereon. Four webs 194 extend radially from the collar 192 to the four corners of an extension duct 196 of square cross section. The duct 196 is slidable within the duct 179 and moves up and down with the sleeve 182. A rack 197 is attached to the sleeve 182, and a pinion 198 is used to move the sleeve axially in the penetration 177 a distance approximating the length of the extension duct. This permits the extension duct 196 to be extended from or retracted into the lower end of the duct 179, as desired. The pinion is supported on a structure 199 which rests on the top of the reactor vessel and which is free to raise upwardly therefrom. Such construction permits both the rack and pinion to move upwardly with the sleeve 182. This will occur when a core element is lifted into the duct 179 for clearing the handling machine, since the plug on the core element will strike the lower end of the sleeve as the core element is raised. When a core element is not attached or raised enough to strike the sleeve, the rack and pinion enables the extension duct 196 to be raised or extended when desired for clearance or for maintaining coolant flow. When not in use, the handling rod 176 is locked to and supported on the sleeve 182 by means of a locking nut 196 identical in construction to the nut 83 in FIG. 8.

To raise or lower a core element from or into the receiving tube of the handling machine, and from or into the loading and unloading penetrations 32 and 33, respectively, the cable and hoist (not shown) are used to raise and lower the rod 176. The rod is coupled and uncoupled to and from the core element by rotating the sleeve 182 and the rod 176 through the worm gear 189 and keys 188. When a hot core element is to be lowered out of the reactor vessel 11 through the removal penetration 33, fluid coolant flow may be maintained by extending the extension duct 196. The maximum extension of the duct 196 is slightly greater than the difference between the length of a core element and the distance from the top of the penetration 33 to the lower end of the duct 179. This insures that, even through the core elements are made shorter than the latter distance for purposes of clearance, at no time during movement of the core elements will both ends thereof be exposed to substantially equal regions of pressure. Coolant flow through the core elements is thereby maintained at all times. Since temperature may not be a problem with the loading of fresh core elements into the core, the loading tool may be constructed without an extension duct 196.

(VI) THE HANDLING METHOD

Although some aspects of the operation of the various elements of the system have been discussed individually, it is felt advisable to describe the complete loading and unloading operation even if some repetition will be necessary. The loading of the reactor core will first be described.

During loading, the coolant pressure within the reactor vessel is maintained at or below atmospheric pressure. The domes 103 above all of the handling rods 77 are removed. The plug 37 is then lowered out of the penetration 36 and into the storage cask 41 by the ram 43. The storage cask is then moved out of the way and the handling machine 42 is installed in the penetration 36. Before inserting the handling machine, however, the rotary section 169 at the top of the receiving tube 137 is oriented so that the baffle section will be oriented in a predetermined direction when the tube is positioned above the loading penetration 32. After inserting and securing the transfer mechanism in the penetration 36 by suitable means, not shown, the coolant circulators 23 and 24 are started to circulate coolant through the receiving tube 137. Actually, cooling may not be necessary during the loading operation, but it is desirable to continue cooling at all times in the event it should become necessary to handle a hot core element.

After positioning the handling machine 42 and starting the coolant flow, the actual transporting of the new fuel element is begun. The housing 104 is rotated and the receiving tube 137 extended until the tube is positioned slightly to the side of the loading penetration 32. A new core element is raised through the penetration by a suitable means, not shown, and is oriented in accordance with the orientation of the rotary section 169. The core element is then pushed up through the penetration until the top thereof extends into the compartment 18.

At this point, the appropriate handling tool 174 above the penetration 32 is utilized. The handling rod 176 of the appropriate handling tool is lowered and turned to couple to the core element. The core element is then lifted until its lower end clears the top level of the section 169. The tube 137 is then moved directly over the penetration 32 and the core element is lowered into the tube. Before decoupling the rod 176 from the core element in the tube 137, the handling tool is used to orient the core element so that it will be in the proper orientation when the handling machine has moved the core element to a station directly below its operating station in the core. This is necessary since, during the movement of the tube 137, the tube and its rotary section 169 will rotate together with respect to the orientation of the square cross section core elements. Orientation of the core element in the tube 137 is accomplished by the worm 191 and worm drive 189, which turn the handling rod 176 through the sleeve 182 to which it is keyed. To prevent decoupling of the handling rod from the core element while orienting the latter, orientation is accomplished with the core element raised free of any support in the receiving tube 137. The downward force of the heavy core element enables the bayonet coupling to thereby prevent relative rotation between the rod and the core element. The core element is then lowered to be supported in the receiving tube. Since the downward force is now relieved, the bayonet coupling permits the handling rod 176 to be decoupled from the core element. The handling rod is then drawn upwardly into the penetration 177.

Once the handling rod 176 is clear of the core element and the receiving tube 137 in which the core is disposed, the housing 104 is rotated and the radial position of the tube 137 on the arm 122 is adjusted until the fuel element in the tube is directly below the operating station into which it is to be loaded. If the orientation of the core element at this point is not exactly correct, the mating surfaces at the top of the core element in the bottom of the grid plate are bevelled and will bring the core element into exact alignment when it is drawn up tightly into the grid. The handling rod 77 at that station is now used to raise the core element into position (by attaching a hoist cable to the rod). Once this is done, the lock nut 83 is screwed into place and the hoist cable is disconnected from the rod 77.

After the core element is removed from the handling machine and moved axially into its operating station in the core, the handling machine is actuated to once again position the receiving tube 137 adjacent the loading penetration 32. The next element to be passed up through the penetration is first oriented to correspond with the position of the rotary section 169. This position will correspond to the position of the last core element to be loaded into the core. The new core element is then lowered partially into the tube 137 in the same manner as the previous core element and its orientation is appropriately adjusted by turning the sleeve 182 on the handling tool 174 above the loading penetration. The new core element is then lowered the rest of the way into the tube, and the foregoing procedure is repeated.

The unloading procedure is carried out after the reactor has been reduced to a subcritical operating level and after the interior pressure within the compartment 18 has been reduced to atmospheric pressure or below. All the domes 103 are removed, and the plug 37 is removed from the penetration 36. The handling machine 42 is then loaded into the pentration 36 in the same manner as in the case of the loading procedure with the single exception that the rotary section 169 at the top of the receiving tube 137 is oriented so that it will correspond with the orientation of the first core element to be unloaded from the core when aligned therewith.

After performing the foregoing steps, the handling machine is operated to rotate the housing 104 and to extend the receiving tube 137 along the arm 122 so that it is directly under the core element to be removed. The lock nut 83 on the handling rod 77 for the core element is disengaged, after attaching a hoisting cable to the handling rod, and the core element is lowered from its operating station in the core into the receiving tube 137. The handling rod 77 is then disengaged from the core element, and the receiving tube is moved to the unloading penetration 33.

With the receiving tube 137 positioned directly over the pentration 33, the handling tool 174 directly above this penetration is used to lift the core element out of the tube. Before the core element is lifted clear of the rotary section 169, it is turned until the section is positioned such that it will conform in orientation to that of the next succeeding core element to be removed from the core when the tube is aligned therewith. The core element is then completely removed from the receiving tube 137 and the receiving tube is moved away from its position over the penetration 33. The core element is then lowered through the penetration, and through the passage 49 into the fuel storage pool, into the transfer cask 51 therein. Suitable means, not shown, are provided for circulating coolant from the unloading penetration 33 back to the circulators. The passage 49 is filled with water up to the bottom of the reactor vessel 11 and, as the core element leaves the penetration 33, it will enter the water in the transfer tube and be cooled thereby as it passes downwardly into the storage pool. The receiving tube 137 is then moved into position underneath the next core element to be unloaded from the core.

The foregoing loading and unloading descriptions have been presented as though a plurality of core elements were to be either successively loaded or successively unloaded. It is also possible to unload a core element from the core, and to replace it with a new element installed in the same location, without removing or replacing other core elements during a given handling operation. This may be accomplished in the same manner and in using the same principles as in the previously discussed processes.

(VII) CONCLUSION

It may therefore be seen that the invention provides an improved nuclear reactor system in which external support is provided for the core elements and in which many internal core element handling operations may be performed directly from outside the reactor vessel. Excessive penetrations, reactor vessel size, and complexity of equipment and control are avoided. The invention further provides an improved core element in which hindrance to the flow of coolant therethrough is minimized while providing good support for the components of the core element. The system utilizes an improved handling machine which provides continuous cooling while core elements are being transported to and from the core but which is relatively simple in construction. The invention also provides an improved method for orienting a rotary baffle section in the handling machine so as to permit the orientation to be accomplished from outside the reactor vessel without utilizing remote controlled machinery.

Various other embodiments of the invention, and modifications thereof, will be apparent to those skilled in the art from the foregoing description and accompanying drawings. Such other embodiments and modifications are intended to fall within the scope of the appended claims.

What is claimed is:

1. A nuclear reactor system comprising a plurality of core elements, means for supporting said core elements at operating stations to form a reactive core, a reactor vessel for enclosing the core, handling means on one side of said core for transporting each of said core elements between a storage station and an intermediate station, a plurality of handling rods, one for each core element and each having means thereon for coupling and decoupling to and from said core elements in response to manipulation of said handling rods, said reactor vessel having a plurality of penetrations therein, one for each of said handling rods, said penetrations being on the side of said core opposite said handling means, said handling rods passing through said penetrations and being axially movable therein, and means exteriorly of said reactor vessel for manipulating said handling rods to couple and decouple same to and from said core elements and for moving said handling rods axially, said handling rods being of sufficient length to extend completely through said core to transport said core elements while coupled thereto between their intermediate stations and their operating stations.

2. A system in accordance with claim 1 wherein said supporting means include a main portion within said reactor vessel, and a plurality of support portions extending through respective ones of said pentrations to project exteriorly of said reactor vessel, and wherein releasable means are provided exteriorly of said reactor vessel for individually attaching said handling rods to respective support portions for individually and releasably supporting said core elements.

3. A system in accordance with claim 2 wherein each of said support portions is keyed to a respective handling rod, said support portions being rotatable with respect to said core elements to couple and uncouple said handling rods from respective core elements.

4. A system in accordance with claim 1 wherein the intermediate stations of said core elements are within said reactor vessel, wherein said handling means include a handling machine for individually transporting said core elements between the irrespective intermediate stations and a second intermediate station within said reactor vessel, wherein said reactor vessel is provided with a transport penetration therein of sufficient size to permit said core elements to be individually transported therethrough, and wherein a further handling rod and associated further penetration are provided opposite said transport penetration for individually moving said core elements clear of said handling machine and for individually transporting said core elements through said transport penetration.

5. A system in accordance with claim 4 wherein said handling machine includes a core element receiving tube, means for directing a flow of coolant gas through said tube, said receiving tube having a freely rotary baffle section therein with an interior cross section conforming to the outer periphery of the core elements for directing coolant through a core element in said receiving tube, whereby said baffle section may be oriented to conform with the orientation of a given core element in the core.

6. A system in accordance with claim 4 wherein said handling machine includes a rotary arm, a core element receiving tube, means for displacing said receiving tube along said arm and for rotating said arm whereby said receiving tube may be positioned in alignment with any one of said core elements in said core, said arm having a passage therein and a slot communicating between said passage and the exterior of said arm for conducting coolant between said passage and said receiving tube, a pair of constant force leaf springs disposed on opposite sides of said receiving tube and covering said slot in said arm, and means on said receiving tube for rolling and unrolling said respective constant force leaf springs as said receiving tube is moved along said arm to maintain communication between said passage and said receiving tube.

7. A system in accordance with claim 1 including a purality of orificing devices for regulating a flow of fluid coolant through the core, each of said orificing devices comprising a shutter adapted to be disposed in the flow of coolant, a control member attached to said shutter and extending through one of the handling rod penetrations in said reactor vessel, and means disposed exteriorly of said reactor vessel for moving said control member to regulate coolant flow.

8. A system in accordance with claim 7 wherein said shutter comprises a disc having an opening therein for accommodating said control member, and further comprises a plurality of vents extending outwardly of said opening and contiguous therewith, said vents terminating sufficiently close to the periphery of said disc as to facilitate cutting thereof to permit removal of said control member from said reactor vessel.

9. A system in accordance with claim 5 wherein each of said core elements includes an elongated housing of square cross section, a plurality of elongated pins contained within said housing, means at each end of said housing for supporting said pins and being of a configuration to permit a flow of fluid coolant to be established through said housing, and a wire grid extending transversely of said housing intermediate the ends thereof for maintaining a spacing between said pins, said wire grid being comprised of a plurality of crossed wires of streamlined cross section to have a minimal effect on coolant flow.

10. A nuclear reactor system comprising a reactor vessel having walls defining a reactor compartment, a plurality of core elements, means for supporting said core elements at operating stations within said reactor vessel, said reactor vessel having a plurality of penetrations in a wall thereof, and a plurality of rods connected to said core elements and extending through each of said penetrations, said supporting means including a main portion within said reactor vessel and a plurality of support portions extending through respective ones of said penetrations to project exteriorly of said reactor vessel, said rods being releasably coupled to said support portions exteriorly of said reactor vessel.

11. A system in accordance with claim 10 wherein said supporting means comprise a support structure extending transversely of the reactor compartment defined by said walls of said reactor vessel, said support structure being supported by walls of said reactor vessel other than the wall having said penetrations, and wherein said support portions comprise sleeves extending through said penetrations to have ends disposed exteriorly of said reactor vessel for coupling to said rods to thereby support said core element independently of the wall of said reactor vessel having said penetrations.

References Cited

UNITED STATES PATENTS

| | | | |
|---|---|---|---|
| 2,848,404 | 8/1958 | Treshow | 176—30 |
| 2,851,410 | 9/1958 | Vernon et al. | 176—31 |
| 3,163,585 | 12/1964 | Metcalfe et al. | 176—30 |
| 3,227,620 | 1/1966 | Cutts et al. | 176—31 |

BENJAMIN R. PADGETT, Primary Examiner

H. E. BEHREND, Assistant Examiner

UNITED STATES PATENT OFFICE
CERTIFICATE OF CORRECTION

Patent No. 3,533,911  Dated October 13, 1970

Inventor(s) Peter Fortescue et al.

It is certified that error appears in the above-identified patent and that said Letters Patent are hereby corrected as shown below:

Column 1, line 15 - for "headling", read "handling".

Column 1, line 55 - for "verious", read "various".

Column 1, line 59 - for "more", read "core".

Column 10, line 9 - for "lower", read "lowered".

Column 12, line 43 - for "odetail", read "detail".

Column 16, line 62 - for "the irrespective", read "their respective".

SIGNED AND
SEALED
JAN 5 1971

(SEAL)
Attest:

Edward M. Fletcher, Jr.
Attesting Officer

WILLIAM E. SCHUYLER, JR.
Commissioner of Patents